Figure 3:
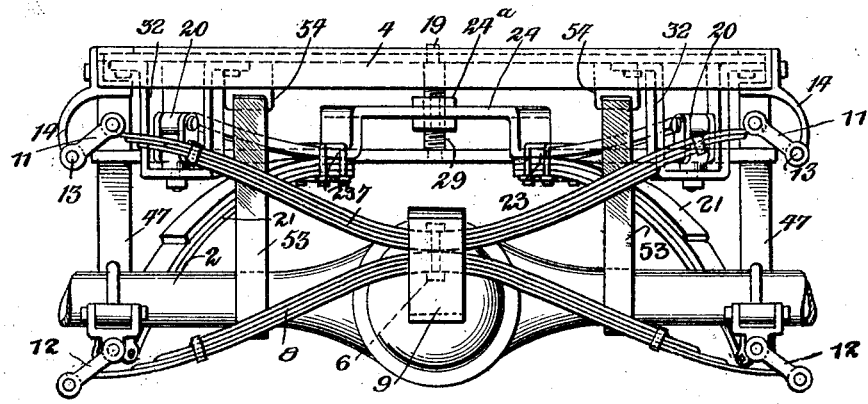

Jan. 31, 1928.
J. G. SPRINGSTEEN
1,657,977
AUTOMOBILE BODY
Filed Nov. 12, 1925   2 Sheets-Sheet 1
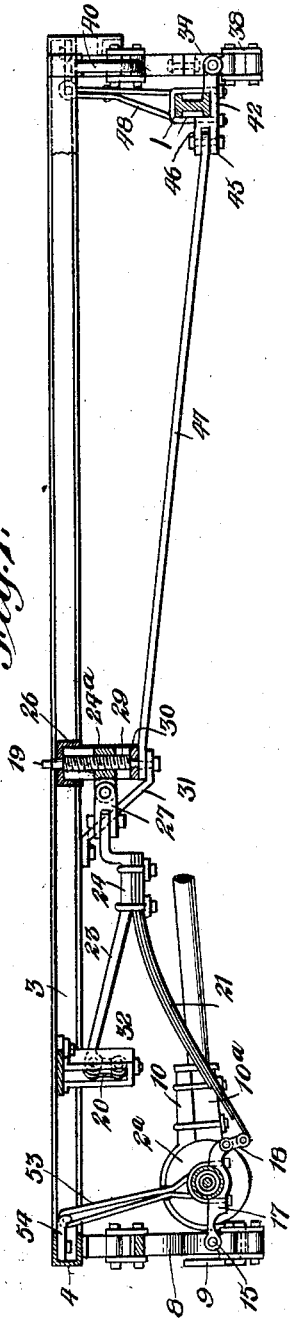
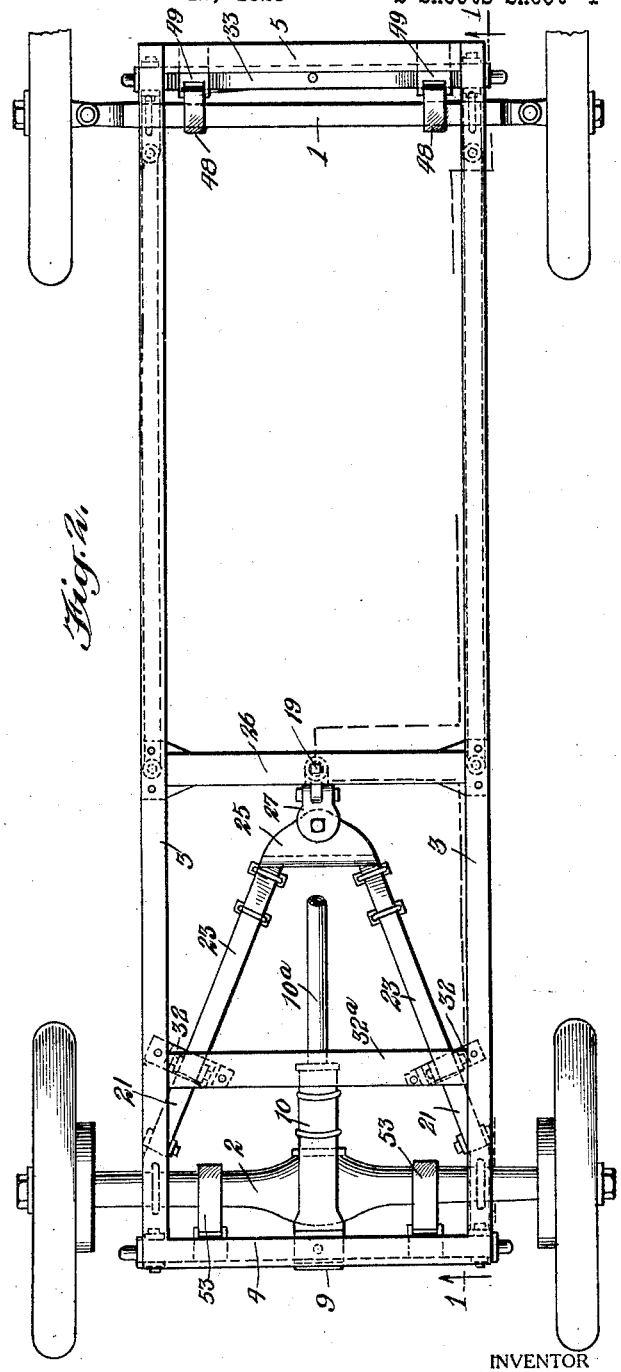
WITNESSES
INVENTOR
J. G. Springsteen
BY
ATTORNEYS Jan. 31, 1928.

J. G. SPRINGSTEEN 1,657,977

AUTOMOBILE BODY

Filed Nov. 12, 1925   2 Sheets-Sheet 2

WITNESSES

INVENTOR
J. G. Springsteen
BY
ATTORNEYS

Patented Jan. 31, 1928.

1,657,977

UNITED STATES PATENT OFFICE.

JACOB G. SPRINGSTEEN, OF MENDON, ILLINOIS.

AUTOMOBILE BODY.

Application filed November 12, 1925. Serial No. 68,726.

This invention appertains to motor vehicles and more particularly to a novel vehicle chassis having novel means associated therewith for the front and rear axles which will effectively absorb road shock and take care of the usual rebound, thereby eliminating the necessity of shock absorbers.

Another object of the invention is the provision of a device for resiliently supporting a body of an automobile from the axles and which will prevent side sway of the body when rounding corners or when the wheels meet with an obstruction which tends to shift the axle suddenly to one side of the usual line of travel.

A further object of the invention is the provision of a vehicle spring which is adapted to be supported in a plane directed outwardly from the axles so that upon road shocks the body of the vehicle is not subjected to an impact from the axles by the springs being jammed between the axle and end member of the chassis frame.

A still further object of the invention is the provision of a device for resiliently supporting a body of a vehicle and in which the tension on the springs may be adjusted to compensate for varying loads carried by said vehicle.

A still further object of the invention is to provide a novel vehicle chassis of the above character, which will be durable and efficient in use, one that will be simple and easy to manufacture and one which can be placed upon the market at a reasonable cost.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 4:
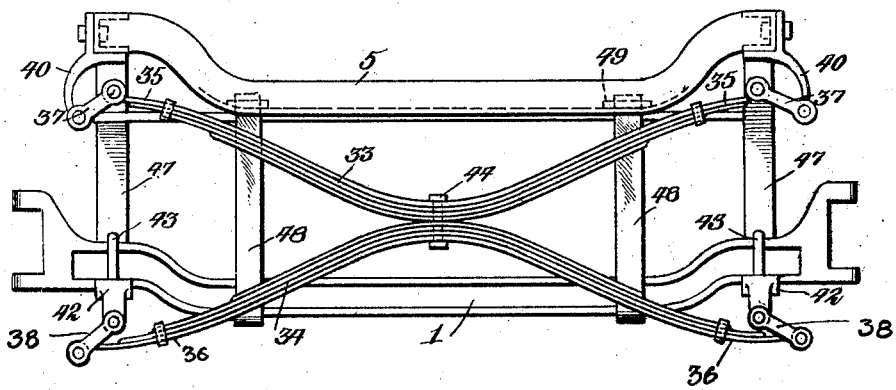

In the drawings:

Figure 1 is a vertical longitudinal section through a vehicle chassis showing the invention applied thereto taken on the line 1—1 of Figure 2, looking in the direction of the arrows, Figure 2 is a plan view of the chassis and spring suspension shown in Figure 1, Figure 3 is an end view in elevation of the rear spring suspension, Figure 4 is an end view in elevation of the front spring suspension.

Preferably my spring suspension is particularly applicable to a chassis frame specially constructed for the purpose but the device may be adapted with certain modifications to chassis frames now in use without in any manner affecting the usefulness of the structure.

It is a well known fact that all resilient suspensions for vehicle bodies require some form of snubber or shock absorber to prevent the rebound and consequent impact during the reaction of the vehicle springs after a road shock to the wheels. To overcome this rebound I have incorporated in the vehicle spring suspension an arrangement of spring and elements which will co-operate to support the body without any appreciable disturbance.

Referring more particularly to the drawings 1 designates the front axle and 2 the rear axle housing. Each of the side bars 3 of the chassis frames are connected together at their rear ends by a transverse bar 4 and at their front ends by a transverse bar 5.

At the rear of the axle housing 2 and located in the same plane with the end bar 4, are mounted a pair of opposed semi-elliptical vehicle springs 7 and 8 of the leaf type with the intermediate or bow sections connected together by a bolt 6. The connected bows of the springs are located in a housing 9 forming a guide for the springs to prevent lateral play. The housing is formed on the end of a bar 10 specially constructed to fit around the differential housing $2^a$ and to be secured to the drive shaft housing $10^a$. From the bow sections the springs 7 and 8 diverge with the two inner adjacent leaves being extended beyond the other leaves and connected respectively to a shackle 11 or 12 as the case may be. The upper shackles 11 are mounted on pins 13 carried by depending horns or hanger brackets 14 bolted to the side bars 3 and projecting downwardly and inwardly from said bars. The lower shackles 12 are pivoted on pins 15 carried in a bearing on the outer ends of bracket plates 17 secured on the rear axle housing 2. It will be noted that the brackets are sufficiently extended beyond a vertical plane passing through the axis of the housing 2 that the springs 7 and 8 will be located in a plane beyond or rearwardly of said axle housing in order that the springs will not be compressed between the housing and the body, thus allowing the springs to operate freely without interference from such elements.

A shackle 18 is also pivoted on each forward end of the bracket 17. The outer end of a leaf of a cantilever spring 21 is connected to one of the shackles 18 at each side of the chassis frame. The other end of said spring is secured by the bolts 22 to an arm 23 of an auxiliary bowed frame 24, which I term a wish-bone spring suspension. This frame has a forwardly projecting plate 25 pivoted to the bifurcated end of a link 27 which in turn is hingedly connected to a reciprocating nut 24ª. The nut 24ª receives a screw 29 mounted in spaced transverse bars 26 and 30. The casing has an opening in one face through which projects a squared end 19 of the screw 29 which is adapted to be engaged by a suitable tool for rotating the screw. The arms 23 of the auxiliary frame 24 diverge and have their rear ends carried by shackles 20 which are mounted in brackets 32 depending from the side bars 3 of the chassis frame. While I have disclosed the forward ends of the arms 23 and the forward ends of the springs 21 connected to the yoke 27, it is to be understood that the forward ends of the arms 23 and the springs 21 can be connected separately to the chassis frame 3.

The extension 19 projects upward through the floors at the rear of the front seat, and a crank or other tool is applied to the squared extension and the screw 29 revolved. By rotating the screw in one direction the nut 24ª is elevated thereby placing greater tension on springs 21, while when lowered the tension is lessened. This device compensates for varying loads and when a greater load is carried a greater tension is required, and vice versa.

A pair of similarly arranged opposed semi-elliptical vehicle springs 33 and 34 of the leaf type are mounted at the front of the vehicle to support the forward end of the chassis frame on the front axle 1 and perform a function similar in all respects to the rear vehicle springs 7 and 8. The front springs have their inner adjacent leaves 35 or 36 extended beyond the other leaves and connected to shackles 37 or 38 as the case may be. The leaves 35 of spring 33 are connected at their opposite ends to the shackles 37 which are hingedly carried by depending horn or hanger brackets 40 bolted to the side bars 3 of the chassis frame. The leaf 36 of spring 34 has each of its ends connected to the shackle 38 which is mounted for oscillation on an end of a bracket plate 42 secured by U bolts 43 to the axle 1.

The bow or intermediate portion of the front vehicle springs 33 and 34 are secured together by a bolt 44.

The bracket plates 42 are extended rearwardly and provided with perforated ears 45 in which is mounted a pin 46. One end of a rod 47 on each side of the frame is pivoted on the pin 46 and the rod is extended rearwardly while the other end of said rod is held in place on a bracket 31 secured to a side bar 3 of the chassis frame. The rods 47 incline upwardly from the front to the rear end and are disposed beneath a side bar 3.

The cantilever springs 21 are directed inwardly from their connection with the rear axle housing 2 and are in vertical alinement with the arms 23 of the auxiliary frame 24 and located below said arms.

In order to limit the frame from an unnecessary rebound I have provided snubbers at the front and rear ends of the chassis which while having a certain degree of flexibility nevertheless will aid in guiding the axles relative to the chassis and restricting the movement of the vehicle springs after the reaction due to road shocks. To this end a strap 48 is connected to a plate 49 mounted on an end of the transverse bar 5, a plate being located on each of said bars. The straps are passed around the axle in the usual manner and extend upwardly from said axle.

Similarly, straps 53 are secured to plates 54 carried by the rear transverse bar 4 of the frame and, fastened to the rear axle housing 2, are passed around the axle housing 2.

During road shocks, the lower springs 34 and 8 of each assembly tend to be compressed to a greater extent than the upper springs 33 and 7 so that on the rebound the upper springs will counteract the rebound effect of the lower springs so that the spring suspension will be brought to an early equilibrium and aided by the straps 48 and 53.

The cantilever springs 21 and bars 47 acting in opposition to each other will also cooperate with the main vehicle springs to prevent not only sideways in conjunction with the rods 48 and 53 but will prevent the usual forward and backward shifting of the body during the road shocks since the momentum of the body when the wheels meet with an obstruction tends to move forwardly and then backwardly after the impact.

It will thus be seen that a plurality of agencies have been provided which do not act independently but all cooperate to produce a unitary result in establishing an equilibrium of forces that tend to cause normally an agitation between the body and the chassis.

What I claim as new is:

1. In a vehicle chassis, a spring suspension for connecting the axles with the chassis frame comprising in combination a pair of bow springs connected intermediate their ends with their ends diverging, plates extending outwardly from and secured in spaced relation on an axle, and shackles connecting the ends of said springs with the outer ends of the plates so that the springs are disposed in vertical planes located outwardly but in parallel relation with the axles.

2. In a vehicle chassis, having a spring suspension for connecting the axles with the chassis frame comprising in combination a pair of bow springs connected intermediate their ends with their ends diverging, means for connecting the ends of one spring to an axle and means for connecting the ends of the other spring to the chassis frame, of a spring means connecting the rear axle with the frame, and means for adjusting the tension on the spring means for compensating for varying loads.

3. In a vehicle chassis, having a spring suspension for connecting the axles with the chassis frame comprising in combination a pair of bow springs connected intermediate their ends with their ends diverging, means for connecting the ends of one spring to an axle and means for connecting the ends of the other spring to the chassis frame, also a U-shaped frame having pivotal connections with the chassis frame at one end, and springs connecting the arms of the U-shaped frame with the rear axle, and means for raising or lowering the end of the U-shaped frame for increasing or decreasing the tension on the last mentioned springs for compensating for varying loads.

4. In a vehicle chassis, a spring suspension for vehicles adapted to compensate for varying loads on the chassis frame and comprising an auxiliary frame having arms diverging towards the rear axle housing of the vehicle, means for flexibly supporting the ends of the arms from the chassis frame, cantilever springs connecting the arms with the rear axle housing and means for elevating or lowering the reduced end of the auxiliary frame for varying the tension on the cantilever springs.

5. In a vehicle chassis, a spring suspension for vehicles adapted to compensate for varying loads on the chassis frame and comprising an auxiliary frame having arms diverging towards the rear axle housing of the vehicle, means for flexibly supporting the ends of the arms from the chassis frame, cantilever springs connecting the arms with the rear axle housing and a screw carried by the chassis frame adapted to be revolved, a nut mounted on the screw and a link connecting the nut with the reduced end of the auxiliary frame, said screw when revolved causing the nut and likewise the reduced end of the auxiliary frame to be elevated or lowered for varying the tension on the cantilever springs for compensating for varying loads.

6. In a vehicle chassis having a spring suspension for connecting the axles with the chassis frame comprising in combination a pair of bowed springs connected intermediate their ends with their ends diverging, means for connecting the ends of one spring to an axle and means for connecting the ends of the other spring to the chassis frame, of spring means connecting the rear axle with the frame.

In testimony whereof I affix my signature.

JACOB G. SPRINGSTEEN.